United States Patent [19]
Gustafsson et al.

[11] Patent Number: 5,662,264
[45] Date of Patent: Sep. 2, 1997

[54] METHOD FOR WELDING ALUMINUM PLATES

[75] Inventors: Jukka Gustafsson, Mynämäki; Kalevi Heino, Turku, both of Finland

[73] Assignee: Kvaerner Masa-Yards Oy, Helsinki, Finland

[21] Appl. No.: 495,989

[22] Filed: Jun. 28, 1995

[30]  Foreign Application Priority Data

Jul. 1, 1994 [FI] Finland ..................... 943158

[51] Int. Cl.$^6$ ............ B23K 9/007; B23K 37/00; B23K 37/04
[52] U.S. Cl. ............ 228/170; 228/173.6; 228/184; 228/212; 219/78.16; 219/86.24
[58] Field of Search ............ 228/170, 173.6, 228/184, 212; 219/91.23, 86.24, 78.16

[56]  References Cited

U.S. PATENT DOCUMENTS

| | | | |
|---|---|---|---|
| 2,579,646 | 12/1951 | Branson | 228/184 |
| 2,684,528 | 7/1954 | Rossheim et al. | 228/184 |
| 3,293,739 | 12/1966 | Hoglund et al. | 228/173.6 |
| 4,181,235 | 1/1980 | Baysinger | 228/184 |
| 4,235,361 | 11/1980 | Hays et al. | 228/173.6 |

FOREIGN PATENT DOCUMENTS

| | | |
|---|---|---|
| 922191 | 11/1993 | Finland . |
| 92658 | 9/1994 | Finland . |

*Primary Examiner*—P. Austin Bradley
*Assistant Examiner*—Jeffrey T. Knapp
*Attorney, Agent, or Firm*—Smith-Hill and Bedell

[57]  ABSTRACT

A method for manufacturing a large basically spherical vessel from plane aluminum plates having a thickness in the range from about 20 mm to about 70 mm, comprises (a) forming at least first and second plane plate assemblies by downhand welding together plane plates controlled by a welding device including an adjustably lockable portal, (b) cutting each welded plane plate assembly to a peripheral shape that fits into the structural pattern of the vessel except for an allowance for machining in step (d), (c) bending each plate assembly to part-spherical configuration, (d) machining respective edges of the first and second bent plate assemblies to a profile suitable for welding in step (e), and (e) downhand welding the first and second plate assemblies together along the machined edges using a manipulator device that includes a tiltable support.

18 Claims, 4 Drawing Sheets

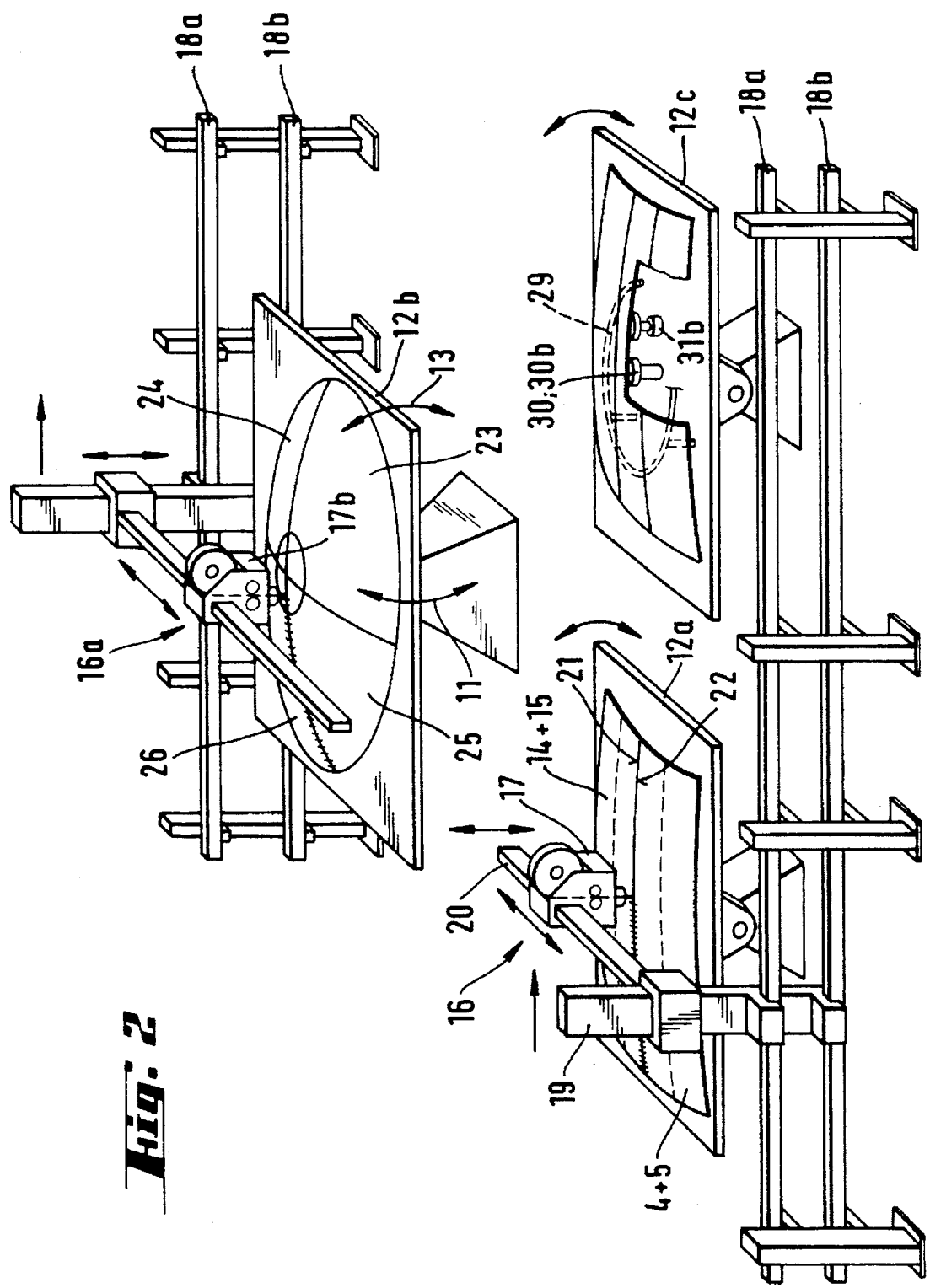

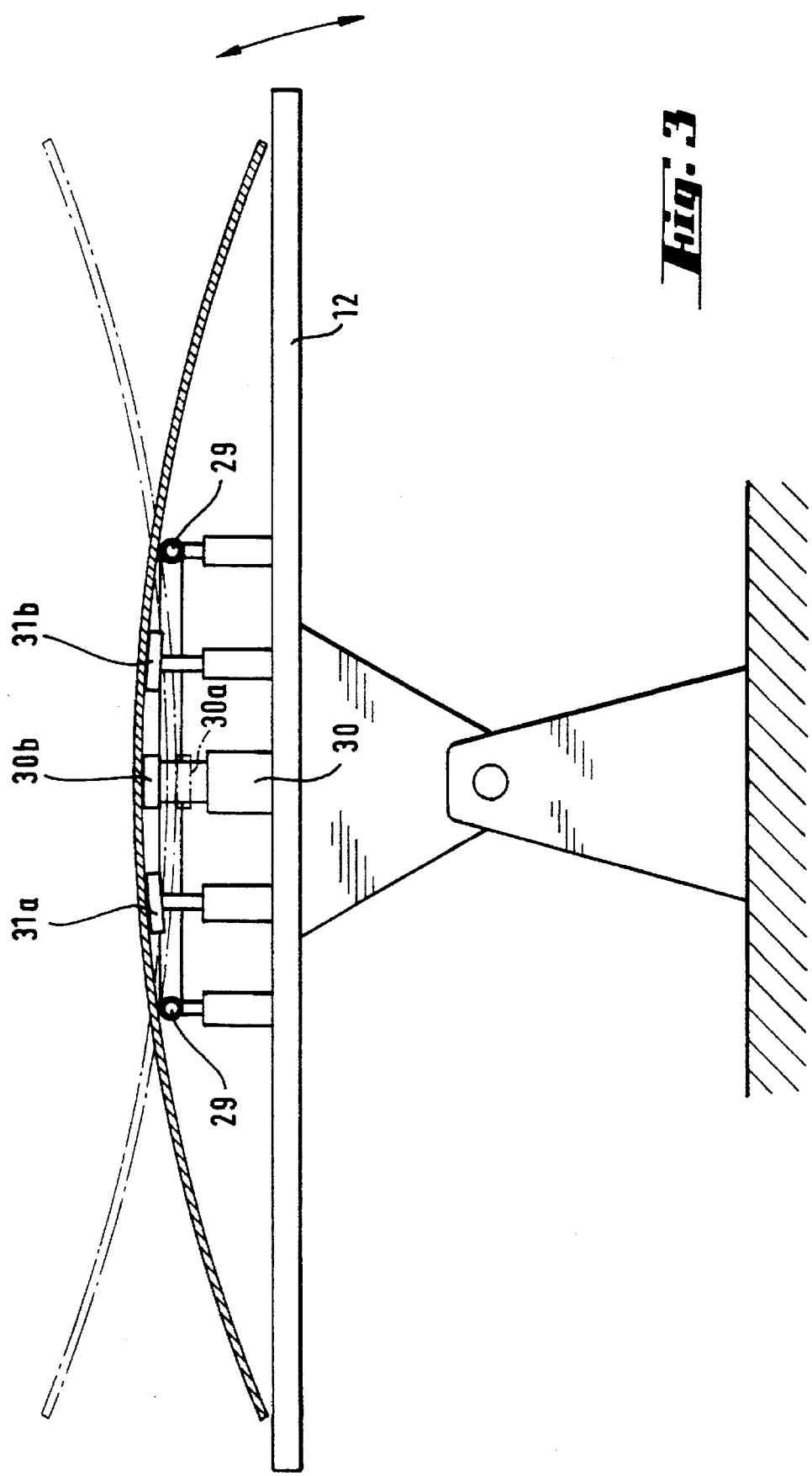

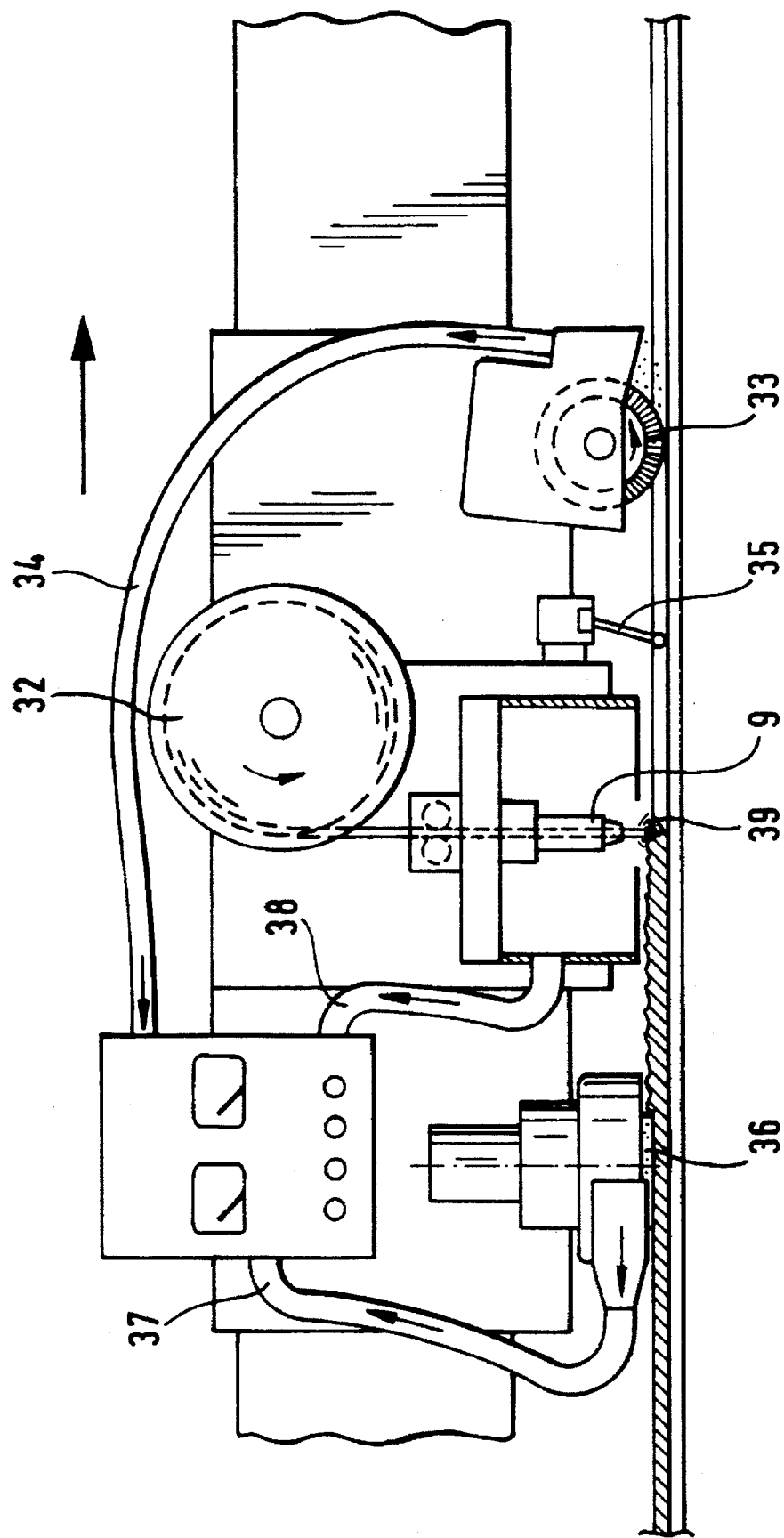

METHOD FOR WELDING ALUMINUM PLATES

BACKGROUND OF THE INVENTION

This invention relates to a method for welding aluminum plates for manufacturing a large spherical structure and to a large spherical structure manufactured by this method.

A ship-borne tank for liquified natural gas (LNG) may be manufactured by welding together large and thick aluminum plates and bending the resulting plate assemblies to form them to portions of the desired spherical LNG-tank. The same kind of tank may be used elsewhere for the storing of LNG and other substances. Because a large part of the manufacturing costs are welding costs, the plate blanks that are welded together should be as large as possible. Joining together this kind of large plate blanks and welded plate assemblies by further welding is demanding work, because all weld joints must be of high quality. Also the plates and the plate assemblies must be precise in shape and dimension for achieving a proper final result.

U.S. patent application Ser. No. 08/061,193, the disclosure of which is hereby incorporated by reference herein, discloses a method of manufacturing a large spherical LNG-tank by welding together several plane aluminum plates to form a planar plate assembly and subsequently forming the plate assembly in a mold to part-spherical configuration and using the formed plate assembly in the following stage of manufacture. However, during bending of the plate assembly in the mold, the plate assembly stretches somewhat, which makes it difficult to use modern high power MIG-welding equipment for welding in one pass per side because there are shape defects in the welding groove and at its root.

It is known also to manufacture spherical tanks of plates that are welded together to form larger plate assemblies by a so-called tractor type welding carriage. However, use of a tractor type welding carriage is difficult and time consuming, especially at start and finish of the welding operation. Known manufacturing methods using tractor type welding equipment for welding together plates that have been cut to a particular peripheral shape and/or bent to a desired configuration also require twice as many assembly stations. It is necessary to remove the weld reinforcement before forming in order to allow the inspections that are included in many methods and because of the forming itself. Special attention must be given to the automation of the work and to the dimensional precision of the final work.

SUMMARY OF THE INVENTION

The object of the invention is to achieve a high level of automation in the manufacture of large spherical LNG-tanks and to improve the quality of both the welds and the manufactured spherical tank.

A large spherical LNG-tank or the like having a diameter of more than 20 meters, even more than 40 meters, is usually manufactured of aluminum plates that are 20–70 mm thick. The plates to be welded are fixed during welding by jigs and suction fastening devices. In a preferred embodiment of the invention, large plane plate assemblies are formed by downhand welding of plane plates using manipulator devices equipped with an adjustable and a lockable portal. The manipulator device comprises, in addition to the welding equipment, a device for brushing the weld groove in order to remove impurities present in the groove and the oxide layer present on the surface of the aluminum. Removing the oxide layer reduces the possibility of defects in the weld.

The groove brushing device moves along the weld groove in front of the welding device most suitably at a distance of half a meter from the welding device. The manipulator is also provided with a milling cutter for removing the weld reinforcement. The cutter moves in the direction of the weld groove behind the welding device and removes the weld reinforcement immediately after the welding. Because the cutter is provided as part of the manipulator device, the cutting is accurate and fast and the repeatability of the cutting is excellent. The plates and plate assemblies welded together are plasma cut to a size and peripheral shape suitable for a spherical LNG-tank, but working allowance is left, because the machining of the edges of the bent plate assembly to a suitable profile for the subsequent welding is done with a form milling cutter. Accurate forming of the groove and the production of smooth groove surfaces are important for achieving a good enough weld and for achieving compatible edge surfaces of the plates to be joined. The plate assemblies are bent to spherical configuration and two such bent plate assemblies are joined by a flat butt weld using a manipulator device and a tilting device. The spherical LNG-tank to be manufactured is assembled of large sections at the final building site.

The aluminum plates are welded together with the help of a manipulator device with only one pass per side irrespective of material thickness. For this purpose, a high power welding device may be used. Fastening and turning equipment is provided for turning the plate assembly upside down so that the weld of the other side may be accomplished. For speeding up the work it is advantageous to employ a production line in which turning equipment is located between two manipulators of the line.

For welding plane plates together to form a large plate assembly, the suction fastening device holding the plane plates is tilted so that the inclination of the groove in the welding direction is 4°–7°, preferably about 5°, upwards. It is then possible to use a high power welding device and complete the weld joint at one side in one pass, because full control of the melt is easily achieved when the weld groove is in a slightly inclined position.

The plate assemblies that have been bent to part-spherical configuration for subsequent welding together are fixed to a tiltable table, by means of which the inclination of the plate assemblies at the welding location is set to a value of 4°–7°, preferably to the value of 5°, upwards in the welding direction by continuously adjusting the tiltable table during welding. This makes it possible to use a high power welding device and complete the weld joint at one side in one pass for the reason mentioned above.

It is advantageous to support at least two plate assemblies of part-spherical configuration by a support device mainly in the shape of a circular ring. The plate assemblies may be disposed with either the convex side or the concave side upwards for welding. The diameter of the circular ring should be as large as possible for achieving a good support, but small enough that the plate assemblies totally cover it. One may also use a suction fastening device, which may be of a known type, with suction heads that face the plate assembly and are easily adjustable and are lockable for the time of the work in a vertical position suitable for either the convex side or the concave side of the plate assembly.

The height of the support structure in the middle area of the support assembly is adjustable depending on whether the plate assemblies to be welded are positioned with the concave or the convex side upwards. According to a preferred embodiment, the support structure in the central point of the circular ring comprises a smaller circular ring with a diameter of, for example, approximately 1250 mm and the height of which is adjustable so that it supports either the convex or the concave side of a plate assembly. Another way is to provide in the central area of the circular ring, an upwardly convex general support area preferably having a part-spherical shape. The plate assemblies to be welded are supported by this area upon adjusting it to a suitable height. For welding upwardly concave plate assemblies one may arrange, in the central support area, an upwardly concave intermediate structure, supporting with its top the central area of the plate assembly.

The weldable edges of the aluminum plates are prepared by a form milling cutter that forms both the root portion and the sides of the groove simultaneously. A cylindrical disc cutter with a relatively large diameter can be used. It is important that the disc cutter moves along such a line and at such an angle to the plate that a weld root surface is produced allowing easy positioning of one plate against another, so that no substantial slot occurs between adjacent root surfaces. If irregularities occur, a slot of about 1 mm between the root surfaces may be acceptable.

The invention also relates to a large spherical LNG-tank or the like, the plate sections of which are manufactured by using the method according to the invention.

BRIEF DESCRIPTION OF THE DRAWINGS

In the following, the invention will be described more fully with reference to the attached drawings, in which FIG. 1 schematically shows a manufacturing equipment according to the invention arranged for joining plane plates, FIG. 2 schematically shows a manufacturing equipment according to the invention arranged for joining plate assemblies of part-spherical configuration for applying a method, FIG. 3 schematically shows a fastening and support equipment for welding part-spherical plate assemblies, FIG. 4 schematically shows accessories of a manipulator device.

DETAILED DESCRIPTION

Figure 1:
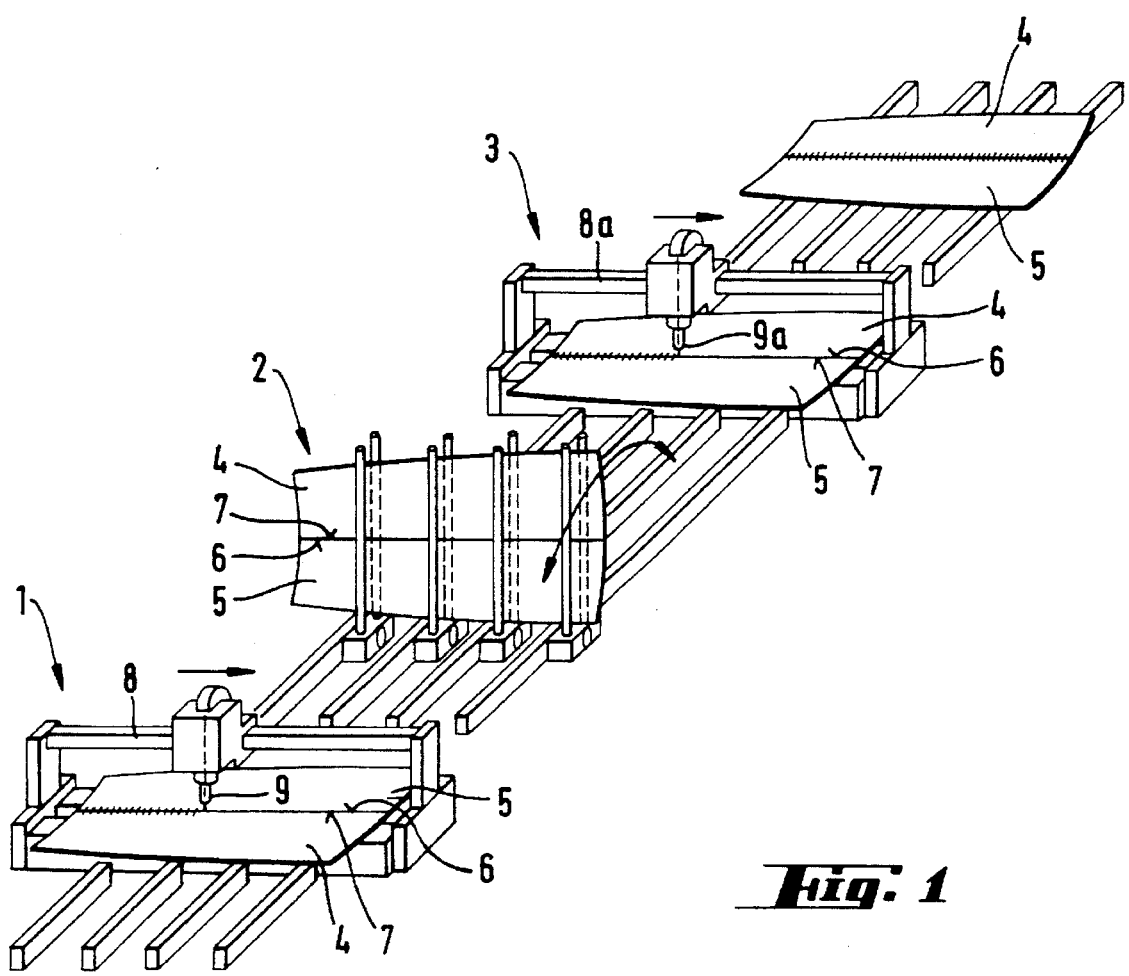

In the drawings, a production line for joining plane plates to form plate assemblies is formed by a welding and manipulating device 1, a turning device 2, and another welding and manipulating device 3 at successive stations. At the first welding station, plane plates 4 and 5, already cut to the desired slightly tapered peripheral shape, are joined by welding. The plate thickness used in the case of a spherical LNG tank is as a rule between 20 and 70 mm, the thinner plates being used in the upper regions of the tank. The plate edges 6 and 7 at which the plates are to be welded are machined to the proper profile by a cylindrical cutter so that a weld groove is formed. The weld groove includes double, symmetrically positioned V-grooves with root face. The root area takes up around 40–50 percent of the plate thickness. The groove angle varies from approximately 90° with thinner plates to approximately 70° with thicker plates. A beam 8 of a portal carries a welding device 9 movable along the beam. The welding device moves to the right of FIG. 1 for welding the plates 4 and 5, and the portal is inclined 4°–7° upward to right of FIG. 1. The inclination may be adjustable and lockable. A tilt angle of 5° is normal. Under the beam 8 there is a suction fastening device (not shown in detail) holding the plates 4 and 5 firmly in place. The suction fastening device is also tilted for welding so that the weld groove is parallel to the portal 8. Other parts are shown in more detail in FIG. 4.

The plane plate assembly formed at the first welding station is turned upside down at the turning station and is delivered to the second welding station.

The welding and manipulating device 3 at the second welding station includes a portal having a beam 8a and a welding device 9a of the same kind as at the first welding station. At the second welding station, welding of the second side of the plane plates 4 and 5 takes place. It is also possible to omit the second welding station and weld the second side of the plate assembly 4, 5 at the first welding station after turning the plate assembly upside down at the turning station.

After welding at both sides, the plate assembly is delivered to a cutting station at which the plate assembly is cut to the proper peripheral shape to conform to the selected spherical pattern, except for a machining allowance. The plate assembly is then bent to spherical configuration, for example in the manner described in U.S. patent application Ser. No. 08/061,193, and the bent and cut plate assembly is delivered to a machining station. At the machining station, a form milling machine is used to machine the edges of the plate assembly to the proper profile, as mentioned above in connection with the plane plates, and concurrently bring the plate assembly to the proper peripheral shape. This is done after the plate assembly has been bent, in order to ensure that the bending operation does not introduce errors.

From the machining station, the bent plate assemblies of the proper peripheral form and having the proper edge profile are delivered to a bent plate welding station at which two such bent plate assemblies are welded together.

FIG. 2 shows three embodiments 12a, 12b, and 12c of a tiltable welding table that is provided at the bent plate welding station. The welding table is provided with support and fastening equipment, which is shown in more detail in FIG. 3. Table 12a is used for the welding of a spherical curved structure composed of a two-plate assembly 4+5 that has been bent to part-spherical configuration and another similar plate assembly 14+15. A manipulator device 16 carries a welding device 17 on a horizontal beam 20 that is movable vertically on a pillar 19, which in turn is movable horizontally on guides 18a and 18b. The plate assembly 4+5, 14+15 is placed on the table 12a, tiltable through at least ±20°, preferably ±30°, from its horizontal position. By tilting the table 12a, the inclination of the plate assembly 4+5, 14+15 can be adjusted during the welding operation so that the groove is inclined at an angle of 4°–7° at the location of the welding device as the welding device passes along the entire weld.

The plate assembly 4+5, 14+15 is fixed on the table 12a by means of suction fastening equipment. The weld groove formed by plate edges 21 and 22 extends along an arc of a great circle on the spherical structure, and the plate assemblies are positioned so that the arc lies in a vertical plane. The weld groove is therefore substantially straight when viewed from above, and the plate assemblies are positioned so that the weld groove is set parallel to the guides 18a and 18b. The guides 18a and 18b define an axis of horizontal movement that lies in a vertical plane that is perpendicular to the tilting axis of the table. The tilt of the table is continuously adjusted so that the welding always takes place in a groove inclined about 5° upwards. While welding progresses, the pillar 19 moves on the guides 18a and 18b. Should the weld groove not be parallel to the guides 18a and 18b, when viewed from above, correction can be made by moving the welding device 17 on the beam 20 in response to a signal provided by a groove sensor that is described with reference to FIG. 4. The distance of the welding device 17 from the welding groove is adjusted by moving the beam 20 vertically along the pillar 19.

The manipulator device 16 is preferably equipped with a device for removing weld smoke and with groove cleaning devices and a milling device for removing the weld reinforcement. It is also possible to provide quality monitoring devices for monitoring the weld joint.

The tiltable table 12b has two cross-wise arranged tilting axes allowing tilting as indicated by the arrows 11 and 13. Table 12b is intended especially for the plate assemblies of the upper and lower calottes of the spherical tank. These calottes include plates 23, 24, 25, and 26. The welding device 17b of the table 12b has the same freedom of movement as the device 17. The two tilting axes of table 12b make it possible to carry out all welds without releasing the fixation of the workpiece.

The pieces to be welded on table 12c are intended for welding by the welding device 17. Table 12c is an alternative to table 12a. Support and fastening means for the workpiece are indicated by numerals 29, 30, 30b, and 31b, explained below with reference to FIG. 3.

FIG. 3 shows fastening and support equipment located on a tiltable table 12 (table 12a or table 12c) for receiving the concave or the convex side of a part-spherical workpiece. The main support member is a circular ring 29, the diameter of which may be around 10 m when manufacturing portions of a spherical tank with a diameter of about 40 m. At the center of the support ring 29 there is a support 30 provided with a support member 30b, which is higher than the circular ring 29 and is used when welding the convex side of a plate assembly. A corresponding support 30a, of lesser height than the ring 29, is used when the concave side of the plate assembly is welded. Vertically adjustable suction fastening devices 31a, 31b are used for holding the plate assembly against the support ring 29. Instead of the central support 30, with the members 30a and 30b, another annular support of smaller diameter than the ring 29 may be used. This smaller annular support should be vertically adjustable to suit the concavity or convexity of the plate assemblies to be supported.

The plate assembly 4+5, 14+15 is placed on the fastening and support equipment so that when the plate assembly is being welded from its convex side, the two component plate assemblies 4+5 and 14+15 slope away from the weld groove, whereas when the plate assembly is being welded from its concave side, the two component plate assemblies slope toward the weld groove.

FIG. 4 shows a welding device, for instance, a high power MIG-welding device, using a welding wire provided from a roll 32. A cleaning device in the form of a rotating brush 33 is provided for cleaning the groove of impurities and harmful particles and removing oxide film from the aluminum plate. Matter removed by the brush 33 is sucked into a pipe 34, in which an air flow is maintained for removing said matter. A groove sensor device 35 is arranged between the brush 33 and the welding device. The groove sensor device therefore runs in a clean groove, which aids in accurate guiding of the welding device. A cutter 36 is provided for removing the weld reinforcement. The cutting chips are sucked away through a pipe 37. A similar suction pipe 38 removes the weld smoke produced at the welding point 39. It is not necessary in all cases that the welding device should include all the auxiliary devices sown in FIG. 4.

In the case of the welding device shown in FIG. 4 being used at the first welding station, the groove sensor device 35 does not directly control positioning of the welding device in a horizontal direction perpendicular to the beam 8, but is used to test whether the plates are properly positioned with the weld groove parallel to the beam 8. This might be accomplished in either of two ways. In accordance with a first alternative, the welding device is run along the beam 8 without welding, and if the groove sensor does not indicate mispositioning, the welding device is run a second time with the welding electrode active, whereas if the groove sensor indicates mispositioning, the plates are repositioned. In accordance with the second alternative, the welding electrode is activated and the signal provided by the groove sensor stops the welding operation in the event that the welding device does not follow the groove accurately enough.

The welding device shown in FIG. 4 may also be used at the bent plate welding station. The configuration that is shown in FIG. 4 is particularly applicable to the welding device 17b, when used to weld along the beam by which it is supported. In this case, the signal provided by the groove sensor device controls positioning perpendicular to the beam. When used to weld perpendicular to the support beam, the signal provided by the groove sensor device controls positioning along the beam.

After two two-plate assemblies have been welded together at the bent plate welding station from, for example, the convex side, the resulting four-plate assembly is delivered to a turning station at which the assembly is turned upside down, so that the convex side is down, and the assembly is then returned to the bent plate welding station and is placed on a tiltable table with the support and fastening means set to receive the convex side of the assembly. The plate assembly is downhand welded from its concave side in a single pass while adjusting the tilt of the table as described with reference to FIG. 3.

The invention is not restricted to the embodiments shown, but several modifications thereof are feasible within the scope of the attached claims.

I claim:

1. A method of manufacturing a curved structure of welded together metallic plates, comprising supporting two metallic plate members on a tiltable support structure with two plate edges of the plate members adjacent each other and defining a welding groove, joining the edges together by downhand welding by moving a welding device along said welding groove, and tilting the support structure to provide a substantially constant inclination of the welding groove at the position of the welding device as the latter is moved along the welding groove.

2. A method for manufacturing a large basically spherical vessel from plane aluminum plates having a thickness in the range from about 20 mm to about 70 mm, comprising:
   (a) forming at least first and second plane plate assemblies by downhand welding together plane plates controlled by a welding device including an adjustably lockable portal,
   (b) cutting each welded plane plate assembly to a peripheral shape that fits into the structural pattern of the vessel except for an allowance for machining in step (d),
   (c) bending each plate assembly to part-spherical configuration,
   (d) machining respective edges of the first and second bent plate assemblies to a profile suitable for welding in step (e), and
   (e) downhand welding the first and second plate assemblies together along the machined edges using a manipulator device that includes a tiltable support.

3. A method for manufacturing a large spherically curved structure from plane aluminum plates having a thickness in the range from about 20 mm to about 70 mm, comprising:

(a)
  (i) forming a first plane plate assembly by positioning two plane plates to meet in edge-to-edge relationship along a line that is inclined to horizontal and downhand welding together the plane plates in an upward direction along the line at which they meet,
  (ii) forming a second plane plate assembly by positioning two plane plates to meet in edge-to-edge relationship along a line that is inclined to horizontal and downhand welding together the plane plates in an upward direction along the line at which they meet, (b) cutting each plane plate assembly to a peripheral shape that fits into the structural pattern of the spherically curved structure except for an allowance for machining in step (d), (c) bending each plane plate assembly to part-spherical configuration, (d) machining respective edges of the first and second bent plate assemblies to a profile suitable for welding in step (f), (e) positioning the first and second bent plate assemblies to meet at their machined edges along an arcuate line that extends upward from a first end of the line in a direction toward a second end of the arcuate line, and (f) downhand welding the first and second bent plate assemblies together in said direction along the arcuate line from the first end of the arcuate line to the second end thereof, whereby location of welding advances along the arcuate line, while adjusting orientation of the bent plate assemblies such that as the location of welding changes, the tangent to the arcuate line at the location of welding remains inclined to horizontal.

4. A method according to claim 3, wherein step (d) comprises removing the machining allowance and simultaneously both bevelling an edge of the first bent plate assembly and forming a root surface along said machined edge.

5. A method according to claim 3, wherein step (f) comprises downhand welding the first and second bent plate assemblies from one side in a single pass, turning the bent plate assemblies over so that opposite sides of the two bent plate assemblies are upward, and downhand welding the bent plate assemblies from said opposite side in a single pass while adjusting orientation of the bent plate assemblies such that as the location of welding changes, the tangent to the arcuate line at the location of welding remains inclined to horizontal.

6. A method according to claim 3, wherein step (d) comprises machining edges of the first and second plate assemblies to form a double V groove with a root face.

7. A method according to claim 1, wherein at least one of steps (a) (i) and (a) (ii) comprises downhand welding the plane plates from one side in a single pass, turning the plane plate assembly over so that opposite sides of the two plane plates are upward, and downhand welding the plane plates from said opposite side in a single pass.

8. A method according to claim 1, wherein at least one of steps (a) (i) and (a) (ii) comprises employing a suction fastening device to hold the plates so that the weld groove is inclined to horizontal at an angle of 40°–7°.

9. A method according to claim 8, wherein the angle is about 5°.

10. A method according to claim 3, wherein the two plane plates of step (a) (i) or step (a) (ii) are beveled along their adjacent edges to form a weld groove, and step (a) (i) or step (a) (ii), as the case may be, further comprises depositing weld metal in the weld groove, whereby a weld reinforcement extending above the plane plates in formed, and removing the weld reinforcement.

11. A method according to claim 10, wherein at least one of steps (a) (i) and (a) (ii) comprises employing a milling cutter to remove the weld reinforcement, and wherein the milling cutter moves behind the welding device.

12. A method according to claim 3, wherein the two plane plates of step (a)(i) or step (a)(ii) are beveled along their adjacent edges to form a weld groove, and step (a)(i) or step (a) (ii), as the case may be, further comprises cleaning the weld groove in preparation for downhand welding.

13. A method according to claim 12, wherein at least one of steps (a) (i) and (a) (ii) comprises employing a welding device to deposit weld metal into the weld groove at a welding location and advancing the welding device along the weld groove, whereby the welding location advances along the weld groove, employing a brushing device to clean the weld groove, and moving the brushing device along the weld groove ahead of the welding device.

14. A method according to claim 13, a comprising moving the brushing device along the weld groove at a distance of about 0.5 m ahead of the welding device.

15. A method according to claim 3, wherein step (e) comprises positioning the first and second bent plate assemblies on a tiltable table and step (f) comprises adjusting orientation of the table so that the tangent to the arcuate line at the welding location is inclined to horizontal at an angle of 4°–7°.

16. A method according to claim 15, wherein the angle is about 5°.

17. A method according to claim 15, wherein the spherically curved structure has a convex side and a concave side and step (e) comprises securing the bent plate assemblies to the tiltable table by means of an annular support member that engages either the convex side or the concave side of the structure.

18. A method according to claim 17, wherein step (e) further comprises employing an inner support member for supporting the plate structure inwardly of the annular support member, the inner support member including means for adjusting its height relative to the tiltable table.

* * * * *